Aug. 20, 1963
M. E. PHELPS
3,100,959
TREE SHAKER
Filed March 31, 1961
3 Sheets-Sheet 1
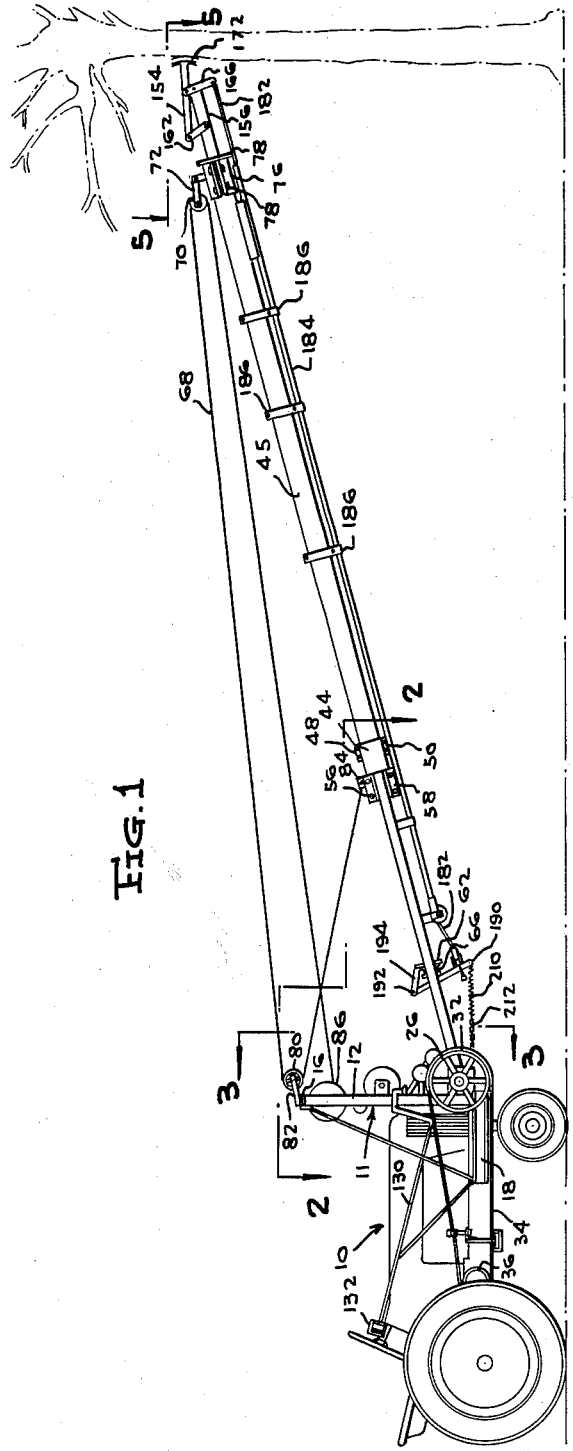
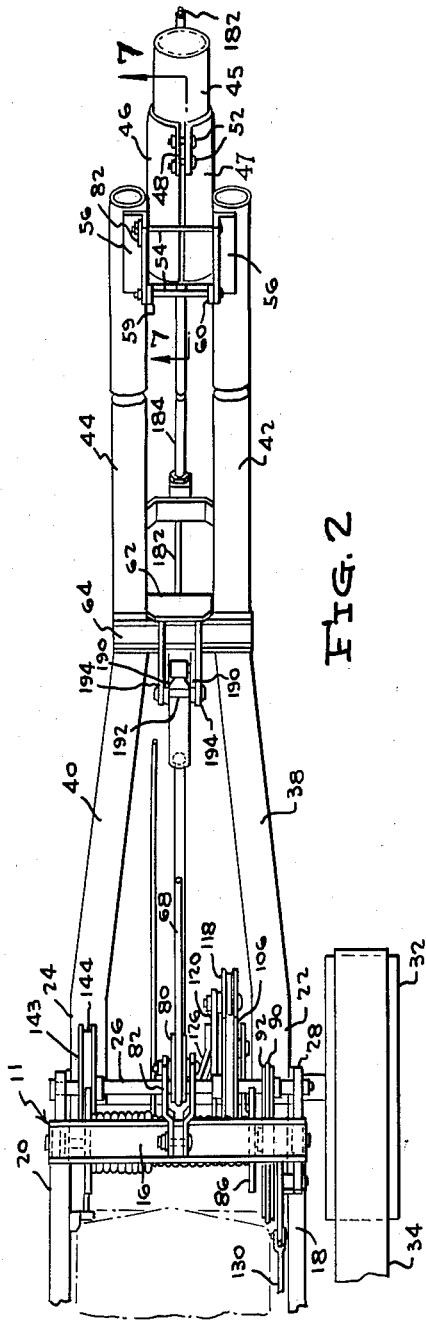
INVENTOR.
MORTON E. PHELPS
BY
McMorrow, Berman & Davidson
ATTORNEYS Aug. 20, 1963  M. E. PHELPS  3,100,959
TREE SHAKER
Filed March 31, 1961  3 Sheets-Sheet 2
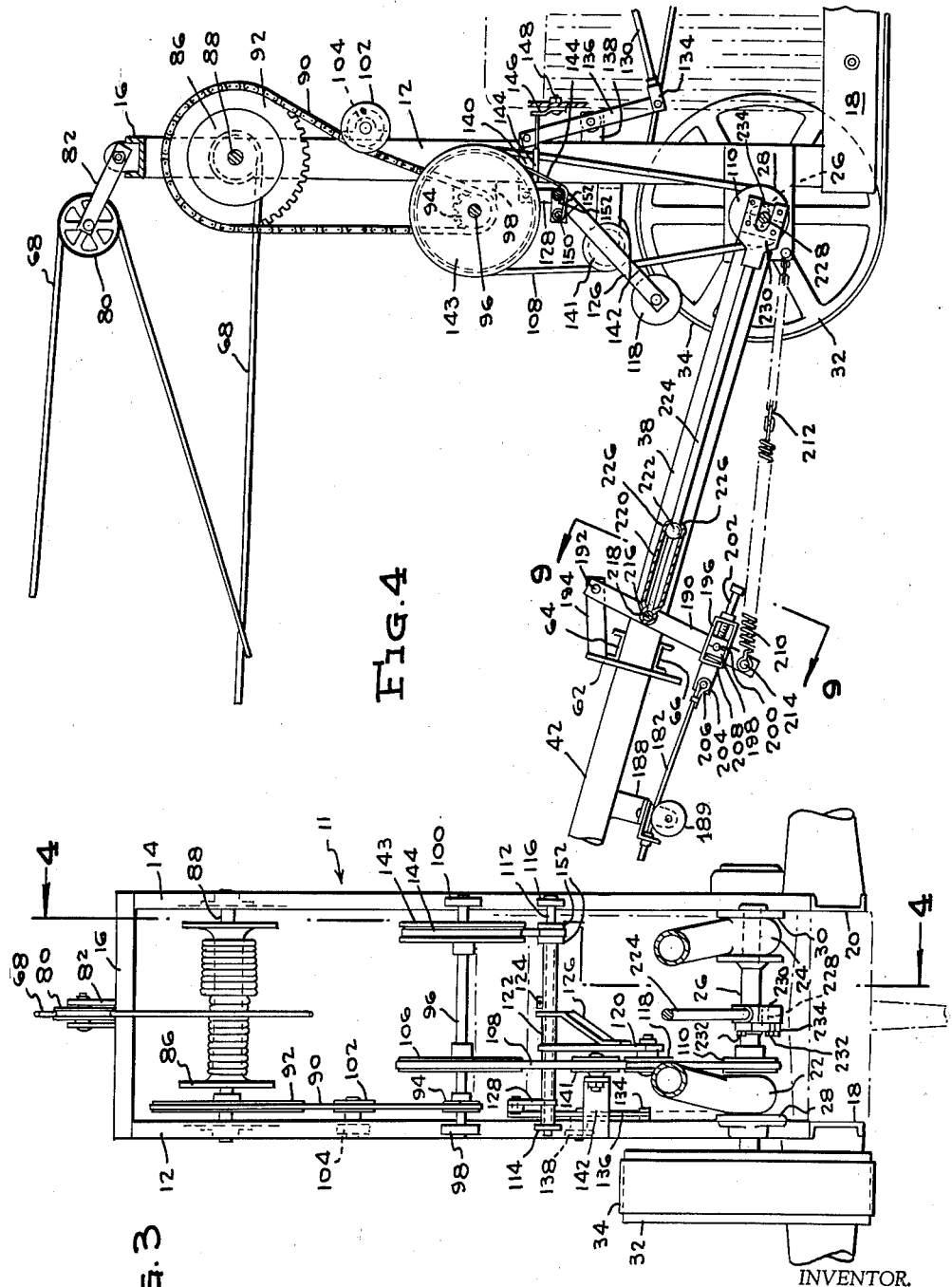
INVENTOR.
MORTON E. PHELPS
BY
McMorrow, Berman & Davidson
ATTORNEYS Aug. 20, 1963 M. E. PHELPS 3,100,959
TREE SHAKER
Filed March 31, 1961 3 Sheets-Sheet 3
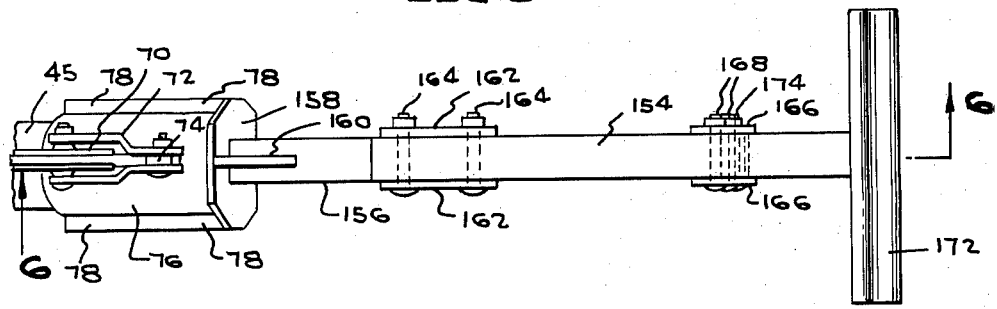
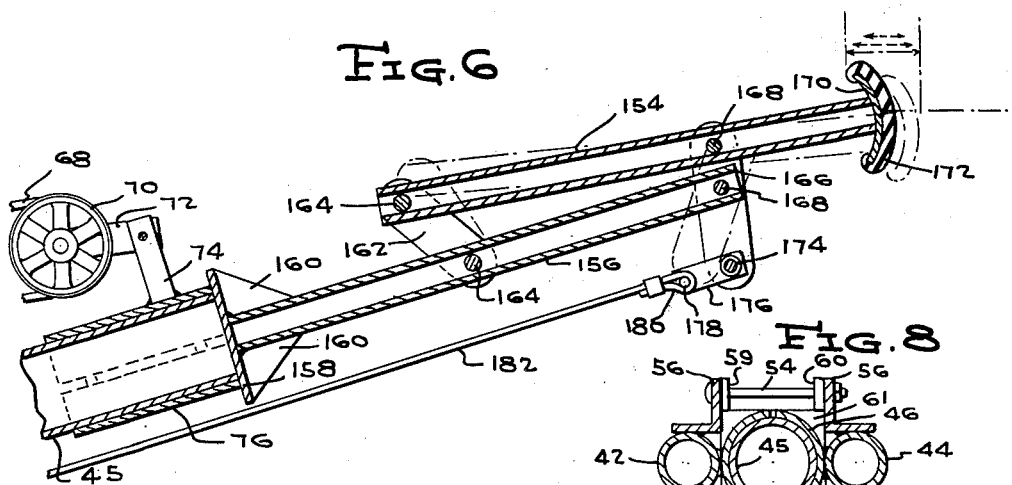
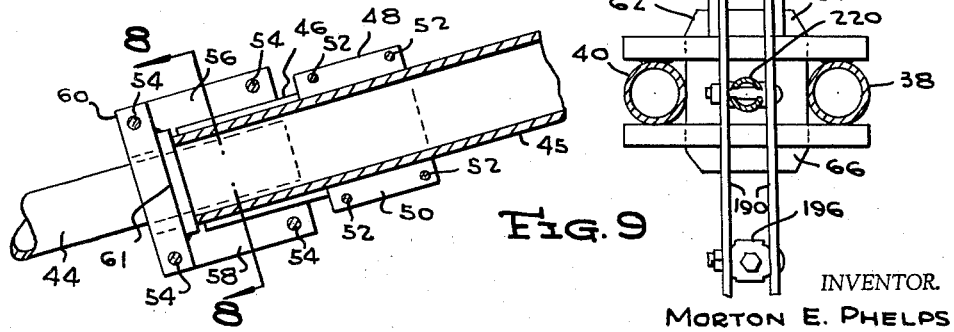
INVENTOR.
MORTON E. PHELPS
BY
McMorrow, Berman & Davidson
ATTORNEYS

United States Patent Office 3,100,959
Patented Aug. 20, 1963

3,100,959
TREE SHAKER
Morton E. Phelps, % Phelps Mfg. Co. Inc.,
715 Thomas St., Little Rock, Ark.
Filed Mar. 31, 1961, Ser. No. 99,921
15 Claims. (Cl. 56—328)

This invention relates to implements for shaking nut trees and the like to harvest the crop, and is particularly concerned with the general type of device having a boom carried by a powered vehicle and having a tree-engaging head, together with means to rapidly reciprocate the head in a line generally transverse to the tree height. Devices of this nature have been invariably attended with difficulties arising from the rigidity, or lack of resilience, in the structure, and the further fact that reciprocation of the head has been limited to motion in a line parallel to the longitudinal extent of the boom. Since the boom is inclined, this results in damage, either to the tree or the machinery. Another drawback in the prior art, where the boom as a whole is moved in the shaking operation has been the necessity of providing slack in the boom cable prior to the shaking. Also, prior devices have involved much loss of time and effort due to the need for starting and stopping the shaking mechanism.

It is therefore an object of the invention to provide a shaker capable of imparting shaking force to a tree along a substantially horizontal line. A further and related object is to maintain a substantially constant direction of the force against the tree throughout its amplitude of sway. Another object is to isolate the shaker system from the boom proper so that the tensions and the arrangement of parts in the latter remain unaffeced and need not be modified. Yet another object is to obtain properly directed forces by means of a flexible, offset shaker head, while maintaining reaction thrusts in a line along the axis of the boom. It is also an object to provide a shaker system which is activated automatically by contact with a tree, thus eliminating operational steps.

The foregoing, and other objects, are attained by the device of the present invention, which may be briefly characterized as comprising a swingable boom, mounted on a suitable vehicle, and having a shaker head mounted on a trapezoidal linkage, the latter having an operating lever arm connected to a reciprocating device powered from the vehicle, the connecting system having a lost motion and a resilient take-up whereby the reciprocating motion is idled when the shaker head is free, but is communicated to the head when the latter is forced against a tree.

For a more detailed description of the invention, reference is made to the following specification, as illustrated in the drawings, in which:

FIGURE 1 is a side elevational view of the complete system of tractor, boom, and shaker head, with the latter shown in engagement with a tree, indicated in broken lines, FIGURE 2 is an enlarged view, in top plan, of a portion of the system of FIGURE 1, as seen along the line 2—2 of that figure, FIGURE 3 is an enlarged sectional view taken along the line 3—3 of FIGURE 1, FIGURE 4 is a sectional view taken along the line 4—4 of FIGURE 3, FIGURE 5 is an enlarged view of a detail of the shaker head, as seen along the line 5—5 of FIGURE 1, FIGURE 6 is a sectional view taken on the line 6—6 of FIGURE 5, FIGURE 7 is a sectional view of a detail, taken along the line 7—7 of FIGURE 2, FIGURE 8 is a sectional view taken along the line 8—8 of FIGURE 7, and FIGURE 9 is a sectional view of a detail, as seen along the line 9—9 of FIGURE 4.

Referring to the drawings, by characters of reference, the system will be described, first with respect to the environmental structure comprising the tractor, power plant, and boom, followed by a description of the novel shaker head and its relation to the other parts. The tractor, in the main, is conventional, and is therefore simply designated, in general, by the single reference numeral, 10. The boom system is carried by a mounting support located forwardly of the tractor, and comprising a sturdy, rectangular frame, of channel members, indicated as a whole by the numeral 11, with a pair of uprights 12, 14, and a top, cross piece 16, welded thereto, the uprights being supported on, and bolted to a pair of channel members, 18, 20, bolted to the sides of the tractor frame, and extending somewhat forwardly of the front of the tractor. The boom, which is extensible in construction, has a dual, tubular, rear unit, with a pair of arms comprising parallel, terminal sections 22, 24, which are mounted, for free swinging movement in elevation, about a countershaft 26, journaled in a pair of bracket plates 28, 30, secured to the inner faces of the respective uprights 12, 14, and extending forwardly therefrom. The countershaft, which delivers power to both the boom and the shaker device, has a large pulley 32, driven by a belt 34 connecting from a pulley 36, geared to the tractor engine.

In conformity with its work load requirements, the boom is of progressively diminishing width outwardly of its swing mounting. Thus, the parallel sections 22, 24, are followed by converging sections 38, 40, and the rear unit of the boom terminates in parallel sections 42, 44, which constitutes the region of the telescoping adjustment of the outer end of the boom. The main element of the latter comprises a single arm in the form of a tube 45, slidable along and between the terminal, parallel sections 42, 44 by virtue of its telescopic mounting in a slide tube, comprising semi-cylindrical sections 46, 47, welded tangentially to the inner sides of tubes 42, 44, and having oppositely disposed pairs of ears 48, 50 receiving bolts 52, by means of which the tube 45 is clamped in the slide tube. Clamping at the rear end of the slide tube is also effected by a set of four bolts 54, cooperating with a pair of angle irons 56 and a similar pair 58, welded, respectively, to the tops and the bottoms of tubes 42, 44. The rearward bolts, on the upper side and the under side, also carry a pair of straps 59, 60, with an attached, rectangular plate 61, which serves as an abutment to receive the main shocks encountered axially of the boom in the shaking process. In a shortened adjustment of the boom, the tube 45 will abut a plate 62, welded to a pair of channel elements 64, 66 welded to the upper and lower sides, respectively of parallel tubes 42, 44 at the rear ends thereof. In order to make the adjustment to the shorter boom length it is necessary to unbolt and remove the straps 59, 60 which carry abutment plate 61. This will be of infrequent occurrence, but if desired the plate 61 may be arranged to be moved out of blocking position by a simple adjustment, such as a slide mounting, for instance.

With the main portions of the boom thus described, the mechanism for raising and lowering the boom will now be detailed. The lift effort is communicated to the outer end of the boom by a cable 68, trained over a pulley 70 journaled in a pair of straps 72 pivotally carried by a lug 74 on a split sleeve 76, which is clamped onto tube 45 at its outer end, by bolts 78. The lifting force is also applied to the boom at an intermediate point, by training the cable 68 over a pulley 80, journaled in a bracket 82, fixed to top beam 16 of the mounting frame, and attaching the end of the cable to a lug 84 secured by one of the bolts 54 on the angle irons 56 in the region of the slide tube of the boom. The lift thus has a mechanical advantage similar to that of a block and tackle, besides lending support to the boom, at an intermediate portion, against bending.

The drive of cable 68 to pulley 70 is communicated from a winch drum 86, keyed to a shaft 88, journaled in uprights 12, 14 in the upper part of mounting frame 11. Shaft 88 is driven, at slow rate, by a chain 90 engaging a large sprocket wheel 92, keyed to the shaft 88, and which is driven by a small sprocket wheel 94, keyed to an intermediate shaft 96, journaled in a pair of brackets 98, 100, secured to and extending forwardly of uprights 12, 14, respectively, intermediately of their height. A tensioning pulley 102 for chain 90 is journaled in a bracket 104 carried by upright 12. Shaft 96 carries a large pulley 106 which is driven by a belt 108, engaging a drive pulley 110 on main countershaft 26.

The drive to pulley 106 is controlled by a belt-tensioning system, with a control leverage mounted on a shaft 112, journaled in a pair of brackets 114, 116 fixed to, and extending forwardly of, the respective uprights 12, 14 of frame 11. Tension is imparted to belt 108 by a swingable pulley 118, journaled in the outer end of a lever arm 120, fixed to a tube 122 which is received on shaft 112 and secured by a set screw 124, with a staggered arm 126, secured to arm 120 and tube 122 furnishing lateral bracing for the lever. The input to the tensioning lever is effected through an arm 128, also secured to tube 122. The input arm 128 is activated through a push-pull rod 130, with handle 132 located near the driver's seat, the forward end of the control rod having a clevis 134, pivotally attached to the lower end of a lever 136, medially pivoted to a bracket 138 carried by upright 12, and pivoted at its upper end to a link 140, which is in turn pivoted to the input lever arm 128 of the tensioning device. It will be seen that a pulling action on the control rod 130 will result in forward movement of the input lever 128, rotating tube 122 in a sense to bring pulley 118 into engagement with belt 108, thus taking up the slack in the belt, and imparting the motion of the pulley 110 of the countershaft thereto, and communicating rotation to pulley 106, and the rest of the system to draw in the cable and raise the boom. In order to render more acute the tensioning force on belt 108, and also to serve as a guide for this belt to insure engagement by pulley 118, there is provided an idler pulley 141, journaled on a bracket 142, which is fixed to upright 12.

Lowering of the boom is achieved by its own weight, a brake unit being provided in the drive system to hold the boom in working position when the tension clutch is inactivated. Thus, there is also keyed to intermediate shaft 96 a pulley 143 which functions as a brake drum, being provided with a belt, or brake band, 144, one end of which is anchored to a bracket 146, secured by a bolt 148 to the tractor body, and the other end of which is anchored to a pin 150 carried by a parallel plate lever arm 152 fixed to sleeve 122. It will be seen that with operating rod withdrawn to the extreme rearward position, lever 152, in its counterclockwise movement (FIGURE 4) has relieved the frictional pull of belt, or brake band, 144, on pulley 143, so that there is no resistance to raising of the boom by the power means. Conversely, when rod 130 is moved to its foremost position, where the power to the boom is removed by slackening of belt 108, the full braking force is applied to pulley 142 by brake band 144, and the boom is thus held in elevational position. The boom is lowered, as desired, by drawing back on rod 130 just a sufficient amount to relieve friction on the pulley 143, whereupon the boom is lowered by its own weight. If its desired to apply a raising force, the rod 130 is moved rapidly to its rearmost position, to pass over the unbraked position without any lowering of the boom, the boom then being set in raised position by a rapid movement of rod 130 to its foremost limit of movement.

The shaker unit, or ram, of the boom, shown in enlarged detail in FIGURES 5 and 6, comprises a quadrilateral linkage, having a tubular movable arm, or thrust element 154 of rectangular cross section, and a similar tube 156 constituting a fixed arm, and welded to a plate 158 on the end of boom tube 42 where it is braced by web plates 160, tube 156 constituting a reaction member, and being pivotally connected to the rear end of tube 154 by a pair of links 162 with pivot bolts 164, and to an intermediate part of tube 154 by a pair of links 166 with pivot bolts 168. Tube 154 thus extends forwardly of pivot 168 and links 166, and is provided with a frusto-cylindrical rammer head 170 for engaging the tree to be shaken, which head is covered with a resilient pad 172 to minimize shock to the machinery as well as damage to the tree. It will be noted that the spacing of the rear pivots 164 is greater than that of forward pivots 168, to compensate for the average elevational angle of the boom in use and render the thrust link 154 substantially parallel with the horizontal. The quadrilateral linkage is adapted to maintain this general orientation, while the swinging movement of rammer link 154 as a whole, and the trapezoidal arrangement of the pivot axes, both conspire to impart an arcuate movement to the rammer head 170, as shown by the broken line, adjusted position in FIGURE 6, which makes possible, contact of the rammer head with the tree throughout the amplitude of swing of the tree, without sensible displacement of the head along the tree transverse to the line of thrust. It is possible, of course, that some small departures from this optimum condition of steady contact may be encountered, as for instance where unusual angles of elevation of the boom are employed. However, the effect will still be of such sufficiently small magnitude as to be canceled out by the yeilding effect due to shearing strains in the resilient pad 172.

In order to actuate the rammer link so that the reaction stresses are absorbed axially of the boom, that is on the general plane of its longitudinal extent and passing through its axis of swing, the input moment to the head is applied at a point below the reaction member 156. Thus, link 166 extends below said member, and carries, near its lower end, a pivot 174 journaling a link 176 having an outer pin 178, to which is anchored the looped end 180 of a tension cable 182, which is reciprocable in a guide tube 184, carried by a series of saddles 186 clamped on boom tube 45, and two brackets 188 suspended from the underside of the tubes 42, 44 in their rearward portion, the rearmost bracket also carrying a guide pulley 189. The cable 182 leads to an operating lever 190 comprising parallel bars pivoted at their upper end on a pin 192 carried at the outer ends of a pair of parallel plates 194 fixed to the rear face of abutment plate 62 and to cross channel 64. The cable 182 is secured to lever 190 (FIGURE 4) through a tension adjusting means comprising a rectangular cage 196 slidably mounted on a bearing block 198 which journals a pin 200 carried between the arms of lever 190 at a point near the lower ends thereof. A screw 202 threadedly carried in one end face of cage 196 is adapted to contact bearing block 198, to adjust the position of the cage with respect thereto, and the cable 182 has a looped end 204 anchored on a pin 206 carried by a bracket 208 on the forward end of the cage. A tension coil spring 210, anchored to bracket 28 of the frame 11 through a chain 212, is anchored at its forward end on a pin 214 carried by the plates of lever 190 near their lower ends, this spring serving to normally hold lever 190 in a rearward position, and consequently, rammer head 170 in a forward position, but yielding to contact of the head with a tree, to permit the head to move rearwardly. As will now be shown, this action results in automatic commencement of the tree-shaking action.

The reciprocating movement for shaking the tree may be broadly described as involving a pitman type connection to the lever 190 which has a lost motion arrangement wherein the periodic thrusts are only communicated to the shaker system linkage after the rammer head has been moved rearwardly for a given distance, against the bias of the spring 210. Lever 190 is of the third class type, that is, with a pivot pin 216, which receives the applied force, located intermediate the fulcrum pin and the output pin 200. Thus, there is journaled on pin 216 a bushing 218 carried on one end of a slide tube 220, in which is slidably mounted the enlarged, ball-shaped, outer end 222 of a pitman, or connecting rod 224, the rear end of the tube being crimped as at 226 to retain the ball and thus to communicate a pulling action to the tube, and hence lever 190, on rearward movement of the pitman whenever the tube is in a forward position. Obviously, when the tube is in a rearward position, the ball 222 will merely slide in the tube without communicating movement thereto.

The oscillating movement of the pitman is caused by an eccentric portion 228 on the main countershaft 26 operating after the manner of a crankshaft. The pitman is mounted on the eccentric through an enlarged, bifurcated head 230 on its rear end, which is slid onto the eccentric and secured by screws 232 to the respective parts of a split bearing block 234 which serves as a journal for the pitman.

In operation, assuming the boom to be adjusted to proper length, handle 132 is actuated, if need be, to raise or lower the boom to suitable elevation to comport with the height and girth, or the location of the branches, of the tree to be shaken. Before, during and after each shaking operation, the main drive belt 34 may continue running, since the boom lift drive merely idles unless the clutch is set, and the pitman connection is also idle unless the shaker ram has been driven back by contact with an obstacle. For the shaking operation, therefore, it is merely necessary to guide the system into contact with a tree. Forward progress of the boom is continued after such contact is made, with the result that rammer link 154 lags behind while the lower link 156 continues forward with the boom, resulting in a forward swing of the lower end of front link 166 and a forward movement of cable 182. This results in forward movement of lever 190, at the rear end of the cable, against the tension of spring 210. During this movement the reaction stresses in the system are minor, since they depend only on the resistance of the spring. However, after tube 220 has taken up the lost motion and contacted the ball on the forward end of the pitman, the system becomes rigid, and the thrust on the tree is, in effect, a direct thrust by the boom. Due to the location of pivot 174 on an opposite side of the boom from pivot 168, the resultant reaction is substantially along the line of the boom. The shaking action will be dependent upon how far the tractor is permitted to advance after take-up of the lost motion. Preferably, this will be at a stage where the pitman just makes contact with the slide tube when the tree is in its normal, unbent position. In such a situation, rearward movement of the pitman bends the tree forwardly of the shaker system, and forward movement of the pitman merely allows the tree to unbend to normal vertical position. However, as a practical matter, since the tree is engaged during continued oscillation of the pitman, the proper degree of engagement is easily determined by sensing, coupled with actual observation of the tree movement and the fall of the nuts, rapid and minute adjustments being possible to achieve optimum shaking.

For readier mounting of the pitman, the shaft 26 may be made in two parts, in which case the eccentric 228 will be on the free end of one of the parts, and the pitman is easily introduced between the shaft parts for mounting or demounting.

While a certain, preferred embodiment has been shown and described, various modifications will be obvious to those skilled in the art, in the light of this disclosure, and the invention should not, therefore, be deemed as limited, except insofar as shall appear from the spirit and scope of the appended claims.

What is claimed is:

1. A tree shaker comprising a mounting frame, a boom having a pair of arms swingably mounted on a horizontal axis on said frame, and a single arm adjustably positionable lengthwise of said boom, said boom having a lift cable and drive means on said frame, including a winch on the frame, operatively connected to said cable, a clutch operatively connected to said winch, and a brake operatively connected to said winch and operable at the off position of said clutch, and idle at the on position and an intermediate position of said clutch, an oscillating ram on the forward end of said single arm, comprising a quadrilateral linkage having a fixed arm secured to said single arm, forwardly thereof and in the general plane of said boom, a movable arm having a tree-engaging head, a pair of links of unequal effective lengths pivotally connecting said movable arm to said fixed arm, one of said links having an extension on the side of said fixed arm opposite from said movable arm, a cable connected to said extension, a lever pivoted on said boom and engaging said cable, spring means urging said lever rearwardly, said drive means including an eccentric, and means, including a lost motion coupling, connecting said eccentric to said lever.

2. A tree shaker comprising a mounting frame, a boom swingably mounted on a horizontal axis on said frame, and including a lift cable, drive means for said cable on said frame including a clutch, and a brake for said cable operable at the off position of said clutch, and idle at the on position as well as an intermediate position of said clutch, a reciprocating ram carried forwardly of said boom, comprising a quadrilateral linkage having a fixed arm secured to said boom forwardly thereof, a movable arm having a tree-engaging ram head, a pair of links of unequal effective lengths pivotally connecting said movable arm to said fixed arm, one of said links having an extension of on the side of said fixed arm opposite from said movable arm, a cable connected to said extension, a lever pivoted on said boom and engaging said cable, spring means urging said lever rearwardly, said drive means including a crank arm, and means, including a lost motion coupling, connecting said crank arm to said lever.

3. A tree shaker comprising a mounting frame, a boom swingably mounted for elevational adjustment on said frame, drive means including a lift cable for raising said boom, a reciprocating ram carried forwardly of said boom, comprising a quadrilateral linkage having a fixed arm carried by said boom generally axially thereof, a movable arm having a ram head, a pair of links of unequal effective lengths pivotally connecting said movable arm to said fixed arm, one of said links having an extension on the side of said fixed arm opposite from said movable arm, a cable connected to said extension, a lever pivoted on said boom and engaging said cable, spring means urging said lever rearwardly, said drive means including a crank arm, and means, including a lost motion coupling, connecting said crank arm to said lever.

4. A tree shaker comprising a mounting frame, a boom swingably mounted for elevational adjustment on said frame, a reciprocating ram carried forward of said boom, comprising a quadrilateral linkage having a fixed arm carried by said boom, a movable arm having a ram head, a pair of links of unequal effective lengths pivotally connecting said movable arm to said fixed arm, one of said links having an extension on the side of said fixed arm opposite from said movable arm, a cable connected to said extension, a lever pivoted on said said boom and engaging said cable, spring means urging said lever rearwardly, drive means, including a crank arm, on said frame, and means, including a lost motion coupling, connecting said crank arm to said lever.

5. A tree shaker comprising a mounting frame, a boom swingably mounted for elevational adjustment on said frame, a reciprocating ram carried forwardly of said boom, comprising a quadrilateral linkage having a fixed arm carried by said boom, a movable arm having a ram head, a pair of links pivotally connecting said movable arm to said fixed arm, one of said links having an extension on the side of said fixed arm opposite from said movable arm, a cable connected to said extension, a lever pivoted on said boom and engaging said cable, spring means urging said lever rearwardly, drive means, including a crank arm, on said frame, and means including a lost motion coupling, connecting said crank arm to said lever.

6. A tree shaker comprising a mounting frame, a boom swingably mounted on said frame, a reciprocating ram carried forwardly of said boom, comprising a quadrilateral linkage having a fixed arm carried by said boom, a movable arm having a ram head, a pair of links pivotally connecting said movable arm to said fixed arm, one of said links having an extension on the side of said fixed arm opposite from said movable arm, a cable connected to said extension, a lever pivoted on said boom and engaging said cable, spring means urging said lever rearwardly, a powered, reciprocating element carried by said frame, and a lost motion connection between said element and said lever.

7. A tree shaker comprising a mounting frame, a boom swingably mounted on said frame, a reciprocating ram carried forwardly of said boom comprising a quadrilateral linkage having a fixed arm carried by said boom and a movable arm having a ram head, a lever pivoted to said boom, spring means urging said lever rearwardly, a powered, reciprocating element carried by said frame, a lost motion connection between said element and said lever, and coupling means communicating rearward movement of said lever to forward movement of said movable arm.

8. A tree shaker comprising a mounting frame, a boom swingably mounted on said frame, a longitudinally reciprocating ram carried on said boom forwardly thereof, spring means acting between said ram and a fixed portion of said shaker, and urging said ram forwardly, a lever pivoted on said boom, a reciprocating element carried by said frame, a lost motion connection between said element and said lever, and coupling means secured to said lever and said ram, and communicating rearward movement of said lever to forward movement of said ram.

9. A tree shaker comprising a mounting frame, a boom swingably mounted on said frame, a longitudinally reciprocating ram carried on said boom forwardly thereof, spring means acting between said ram and a fixed portion of said shaker, and urging said ram forwardly, a reciprocating element carried by said frame, and a lost motion connection between said reciprocating element and said ram.

10. A tree shaker comprising a mounting frame, a boom swingably mounted on said frame, a ram unit carried by said boom, forwardly thereof and comprising a quadrilateral linkage having one side fixed with respect to the boom, and an opposite side mounted for swinging movement between a forward position and a rearward position, spring means acting between said opposite side and a fixed portion of said shaker, and urging said opposite side to a forward position, a reciprocating element carried by said frame, and means including a lost motion coupling connecting said element to the said opposite side of said linkage.

11. A tree shaker comprising a mounting frame, a boom swingably mounted on said frame, a ram unit carried by said boom, forwardly thereof and comprising a trapezoidal linkage having one side fixed with respect to said boom, and an opposite side arranged for swinging movement between a forward position and a rearward position, spring means acting between said opposite side and a fixed portion of said shaker urging said opposite side to a forward position, a reciprocating element carried by said frame, and means, including a lost motion coupling connecting said element to the said opposite side of said linkage.

12. For use as a tree shaking device or the like, in combination, a boom, and a rammer head carried on said boom forwardly thereof, offset from the line of thrust of said boom and swingably mounted on an axis adjacent said line, and means on the opposite side of said line from said head for communicating a force moment to swing said head, whereby thrust reaction stresses are absorbed along said line.

13. A device as in claim 12, said means including a lost motion coupling.

14. A device as in claim 12, said means including a lost motion coupling, and spring means normally urging said coupling to slack condition.

15. A device as in claim 12, a quadrilateral linkage connecting said head to said boom, said means including a lost motion coupling, and spring means normally urging said coupling to slack condition.

References Cited in the file of this patent

UNITED STATES PATENTS

| | | |
|---|---|---|
| 2,159,311 | Berger | May 23, 1939 |
| 2,685,775 | Gould et al. | Aug. 10, 1954 |
| 2,891,372 | Goodwin | June 23, 1959 |